US009301006B2

(12) United States Patent
Cho et al.

(10) Patent No.: US 9,301,006 B2
(45) Date of Patent: Mar. 29, 2016

(54) METHOD AND SYSTEM FOR PROVIDING ADDITIONAL INFORMATION ON BROADCASTING CONTENT

(75) Inventors: Young Bong Cho, Seoul (KR); Do Hyung Kim, Seoul (KR)

(73) Assignee: IPLATEIAKOREA CO., LTD., Seoul (KR)

( * ) Notice: Subject to any disclaimer, the term of this patent is extended or adjusted under 35 U.S.C. 154(b) by 46 days.

(21) Appl. No.: 14/129,968

(22) PCT Filed: Jul. 10, 2012

(86) PCT No.: PCT/KR2012/005468
§ 371 (c)(1),
(2), (4) Date: Dec. 28, 2013

(87) PCT Pub. No.: WO2013/015546
PCT Pub. Date: Jan. 31, 2013

(65) Prior Publication Data
US 2014/0130087 A1    May 8, 2014

(30) Foreign Application Priority Data

Jul. 25, 2011    (KR) .................... 10-2011-0073412

(51) Int. Cl.
*H04N 21/43*    (2011.01)
*H04N 21/439*    (2011.01)
*H04N 21/414*    (2011.01)
(Continued)

(52) U.S. Cl.
CPC ......... *H04N 21/4394* (2013.01); *H04N 21/218* (2013.01); *H04N 21/233* (2013.01);
(Continued)

(58) Field of Classification Search
CPC .................................... H04N 21/4307
See application file for complete search history.

(56) References Cited

U.S. PATENT DOCUMENTS

| 7,673,316 B2 | 3/2010 | Carro |
| 2007/0188657 A1* | 8/2007 | Basson ................ H04N 21/233 348/468 |

(Continued)

FOREIGN PATENT DOCUMENTS

| KR | 1020070045622 | 5/2007 |
| KR | 1020070097678 | 10/2007 |

(Continued)

*Primary Examiner* — Robert Hance
(74) *Attorney, Agent, or Firm* — Ladas & Parry, LLP

(57) ABSTRACT

The present invention relates to a method and a system for providing additional information on broadcast content, and particularly, to a method and a system for providing additional information corresponding to broadcast content displayed on a television to a separate viewer's terminal. The method for providing additional information on the broadcast content is performed by a voice feature extraction server and comprises the steps of: extracting audio feature data of the broadcast content to store voice feature information previously grouped in preset units in a provided storage space; and detecting voice feature information corresponding to the voice feature data received from the viewer's terminal among the stored one or more pieces of voice feature information and transmitting the detected feature information to the viewer's terminal, wherein the viewer's terminal extracts the voice feature data from an input audio signal according to a preset method and transmits the extracted voice feature data to the voice feature extraction server, a temporal position corresponding to the voice feature data is determined from the received voice feature information, and the additional information is displayed at the temporal position.

9 Claims, 8 Drawing Sheets

(51) Int. Cl.
*H04N 21/4722* (2011.01)
*H04N 21/478* (2011.01)
*H04N 21/61* (2011.01)
*H04N 21/218* (2011.01)
*H04N 21/233* (2011.01)
*H04N 21/254* (2011.01)
*H04N 21/41* (2011.01)
*H04N 21/81* (2011.01)

(52) U.S. Cl.
CPC ....... *H04N21/2542* (2013.01); *H04N 21/4126* (2013.01); *H04N 21/41407* (2013.01); *H04N 21/4307* (2013.01); *H04N 21/4722* (2013.01); *H04N 21/47815* (2013.01); *H04N 21/6125* (2013.01); *H04N 21/6187* (2013.01); *H04N 21/8106* (2013.01)

(56) References Cited

U.S. PATENT DOCUMENTS

| 2008/0148316 | A1 | 6/2008 | Kang et al. | |
|---|---|---|---|---|
| 2011/0016172 | A1* | 1/2011 | Shah | G06F 17/30026 709/203 |
| 2011/0063503 | A1* | 3/2011 | Brand | H04N 5/4401 348/500 |
| 2011/0307918 | A1* | 12/2011 | Shuster | G06F 17/30817 725/23 |

FOREIGN PATENT DOCUMENTS

KR 1020090091892 8/2009
KR 1020100050208 5/2010

* cited by examiner

FIG.5
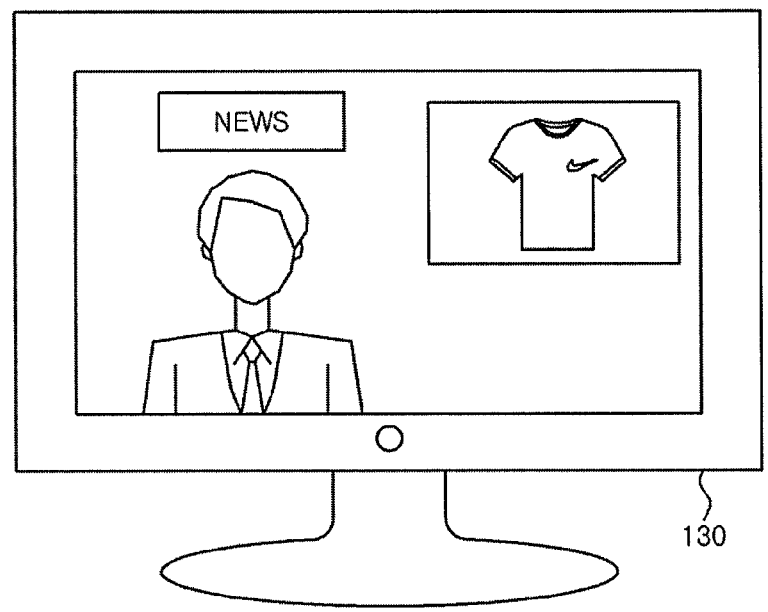
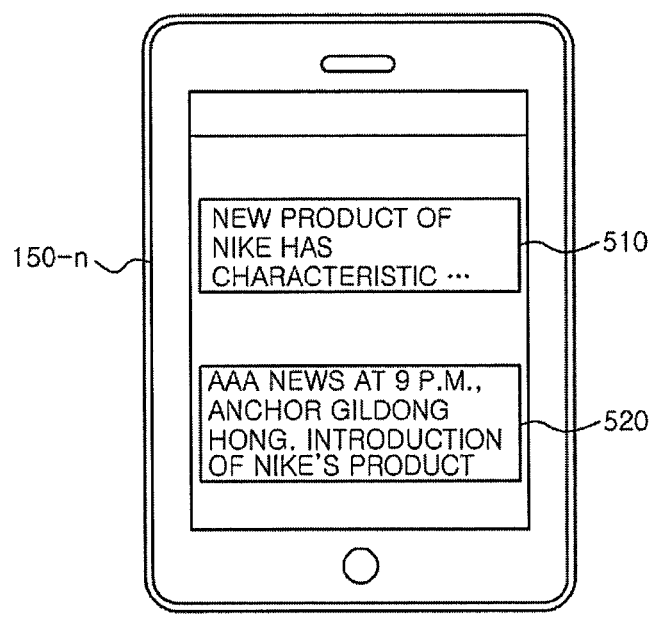

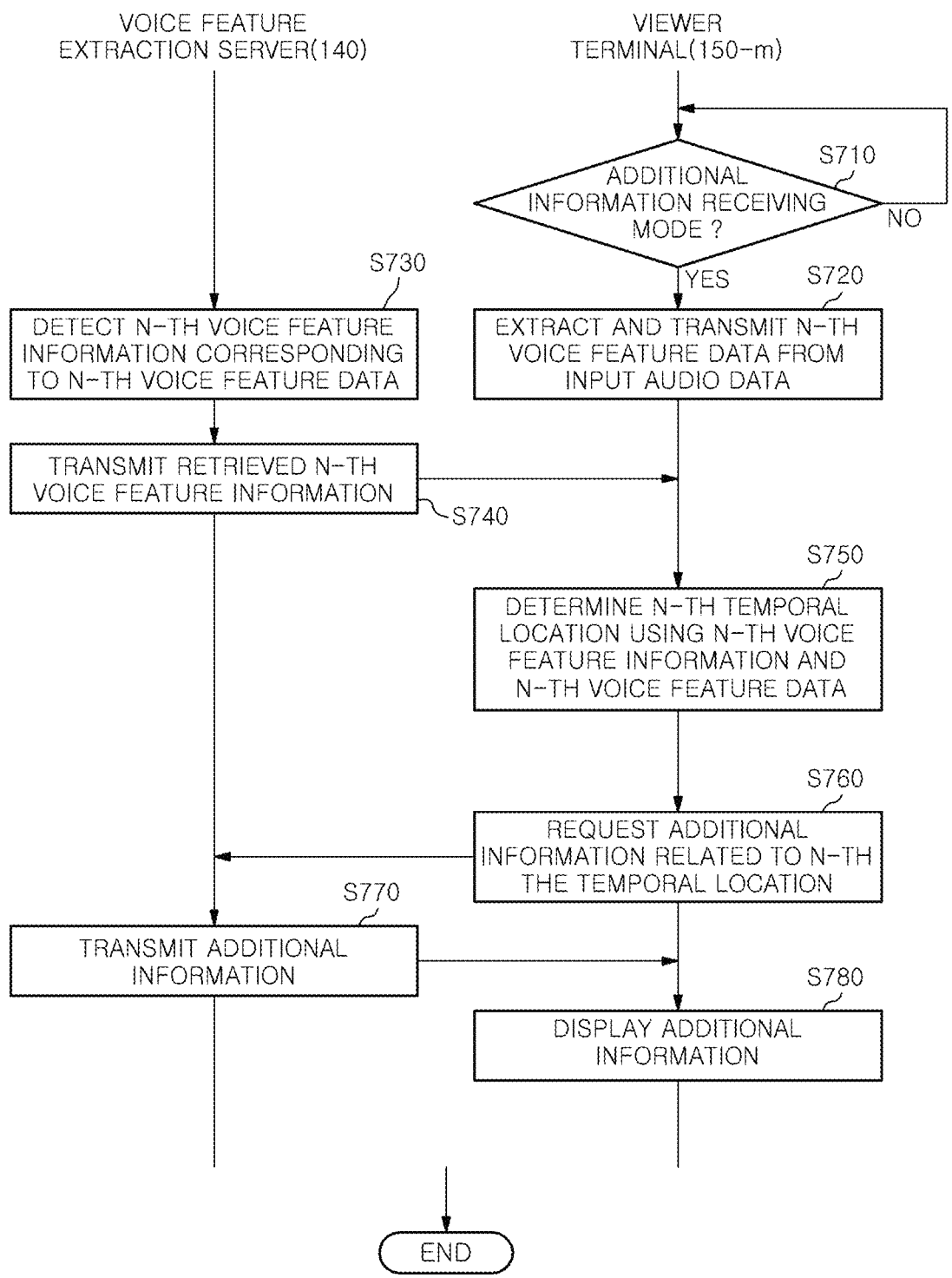

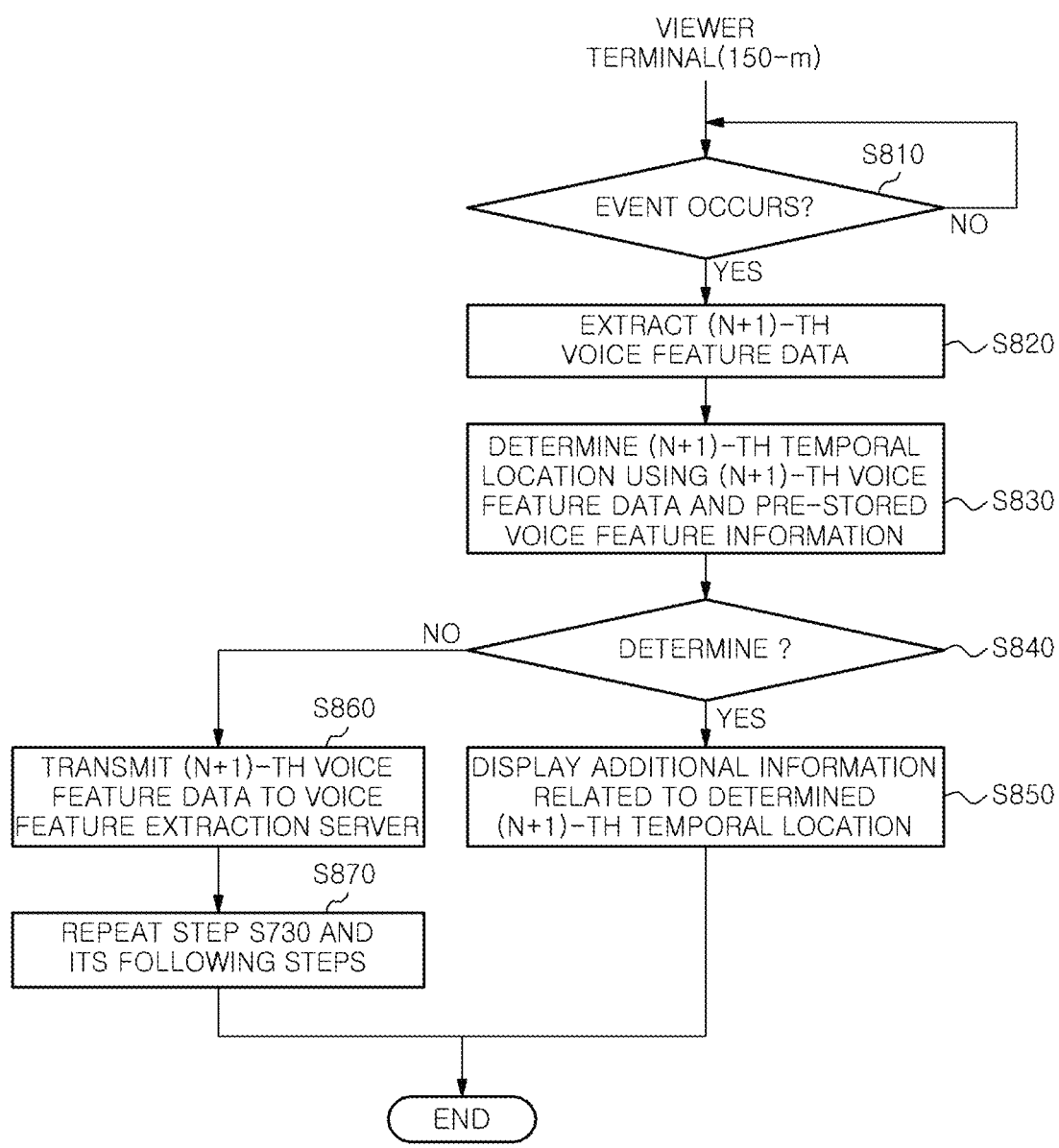

METHOD AND SYSTEM FOR PROVIDING ADDITIONAL INFORMATION ON BROADCASTING CONTENT

CROSS-REFERENCE TO RELATED APPLICATIONS

This application is the U.S. National Stage of International Patent Application No. PCT/KR2012/005468 filed on Jul. 10, 2011, which claims priority to Korean Patent Application No. 10-2012-0073412 filed on Jul. 25, 2011, the disclosures of which are hereby incorporated by reference in their entireties.

TECHNICAL FIELD

The present invention relates to a method and system for providing additional information on broadcast content, and more particularly, to a method and system for providing additional information corresponding to broadcast content that is displayed on a television to an independent viewer terminal.

BACKGROUND ART

Today, televisions (TVs) have been digitized gradually with the development of digital technology (existing analog televisions have been replaced with digital televisions), and on the one hand, a convergence of broadcasting and communication that provide content having other attributes is accelerating. In other words, the initiative is shifted from unidirectional analog broadcasting to bi-directional digital broadcasting that interacts with the viewers. In addition, available methods that the viewers take advantage of the broadcast content are also diversified, inclusive of receiving the broadcast content through Digital Multimedia Broadcasting, the Internet and the like.

Additionally, T-commerce is already in practical use to implement e-commerce via the television, and additional information such as various goods, locations and the like that are informed through the broadcast content is provided to the viewers in real time. In other words, the viewers can purchase various products and perform financial transaction through the television, and can also acquire information such as goods, locations and the like provided from the broadcast content while watching. For example, a viewer can purchase a good that wishes to buy using an Internet TV, and obtain desired information by directly connecting to URL (Uniform resource Locator) provided along with the broadcast content by use of a DMB receiver.

However, the additional information is typically outputted in an overlapped fashion on the image of the broadcast content that is displayed, which may hinder viewing experience of the broadcast content of the viewer. This is because that the additional information is superimposed on the image displayed on the television or DMB receiver to screen a portion of the displayed image.

In addition, when the viewer wishes to access the URL included in the displayed image, an application such as a web browser is executed in a device to display the broadcast content (for example, a personal computer or a mobile terminal, etc.) to interrupt the viewing experience of the viewer. Of course, it may be possible to split a display screen into a screen on which the broadcast content is displayed and anther screen on which an accessed web page is displayed so as to display both. However, this makes the image of the broadcast content small and thus there still remains a problem such as hindrance of the viewing experience of the viewer. This aforementioned problem has become the main obstacle of the activation of the T-commerce. In other words, as the T-commerce means an e-commerce that utilizes a television or a DMB receiver, the viewing experience of the viewer may be interrupted for the reason described above if the viewer wants to use the e-commerce through the use of the television.

Further, when the viewer watches the broadcast content using an analog television or television that is installed in a public place, the additional information does not be available to the viewer. It is because that the viewer cannot utilize the additional information since the analog television itself cannot receive the additional information, and the viewer cannot handle the additional information even if the additional information can be received through the televisions in a public place.

Furthermore, the viewer should buy the Internet television or the like in order to utilize the relevant additional information while watching the broadcast content, which gives a financial burden to the viewer.

In order to solve these problems, it may be necessary to separate a device through which the viewer watches the broadcast content (for example, a television receiver, a desktop computer, etc.) and another device through which the additional information is provided, and such a separation needs to synchronize the broadcast content and the additional information.

In this regard, a conventional art discloses a method of synchronizing the local times of a broadcast transmitter and a broadcast receiver using a universal time of GPS only during a real time broadcasting (see, U.S. Pat. No. 7,673,316). However, the conventional art has a demerit that it cannot find out automatically whether what kind of content the viewer watches and is not applicable to the content such as an on-demand video or on-demand DVD. That is, the conventional art has a shortcoming that is merely applicable to the broadcast content that is provided from a CP (Content Provider).

Another conventional art discloses a method including receiving an audio sample of a content that a viewer is watching, determining a temporal location within the content of the received audio sample (e.g., an audio fingerprint), detecting additional information corresponding to the temporal location to transmit the addition information to a terminal of a viewer (see, U.S. Patent Publication No. US2011/0063503). However, the conventional art searches the temporal location of the voice sample based on the voice sample received from a remote server, and thus the terminal of the viewer should periodically mutually communicate with the server in order to identify whether the viewer changes the viewing content (e.g., channel shift or skip over the reproducing time, etc.). This consumes a network bandwidth and imposes a load on the server. Although the network bandwidth consumption and/or the load on the server may be relieved by way of lengthening the communication time period between the server and the viewer terminal, it may cause another issue that the conventional art cannot sensitively respond to the change in the content viewing of the viewer.

DISCLOSURE

Technical Problem

In order to solve the aforementioned problems, the present invention provides a method and system for providing additional information relevant to content that a viewer is watching, which are capable of transmitting the additional information to a separate terminal independent of a terminal on which the relevant content is displayed.

Further, the present invention provides a method and system for providing additional information on broadcast content, which are capable of automatically identifying whether what content the viewer is watching.

Further, the present invention provides a method and system for providing additional information on broadcast content, which are capable of reducing the load on a system and minimizing network bandwidth consumption.

Technical Solution

In accordance with an aspect of the present invention, there is a method performed by a voice feature extraction server for providing additional information on broadcast content to a viewer terminal connected through a data communication network, the method includes extracting audio feature data from the broadcast content and grouping it in a predetermined unit to store as voice feature information in a reserved storage space; and detecting voice feature information corresponding to voice feature data received from the viewer terminal from among the stored one or more pieces of voice feature information and transmitting the detected feature information to the viewer terminal, and the viewer terminal is configured to extract the voice feature data from an input audio signal in accordance with a preset method to transmits it to the voice feature extraction server, determine a temporal position corresponding to the voice feature data from the received voice feature information, and display the additional information related to the temporal position.

The method further includes transmitting the additional information corresponding to the voice feature information to the viewer terminal.

The method further includes transmitting the additional information relevant to the additional information upon a receipt of a request for the additional information from the viewer terminal, and the viewer terminal is configured to demand the request of the additional information in which the temporal location is included, and display the additional information related to the temporal location when receiving the additional information as a response to the request for the additional information.

The extracting audio feature data from the broadcast content and grouping it in a predetermined unit includes grouping the audio feature data in a predetermined unit of time or in a predetermined unit of volume.

In accordance with other aspect of the present invention, there is a method performed by a viewer terminal for providing additional information on broadcast content to a viewer, the method includes extracting n-th voice feature data from an input audio data in a predetermined method to transmit it to a voice feature extraction server that is connected through a data network; determining an n-th temporal location relevant to the n-th voice feature data from n-th voice feature information that is received as a response to the n-th voice feature data; and displaying the additional information related to the n-th temporal location where n is a natural number, and the voice feature extraction server is configured to detect the n-th voice feature information corresponding to the n-th voice feature data from among voice feature information in which audio feature data is extracted from the broadcast content and is grouped in a predetermined unit and transmit it.

The displaying the additional information includes transmitting a request for the additional information in which information about the n-th temporal location is included to the voice feature extraction server; receiving the additional information from the voice feature extraction server as a response to the request for the additional information; and displaying the additional information related to the n-th temporal location, and the voice feature extraction server is configured to transmit the additional information related to the n-th temporal location when receiving the request for the additional information.

The method further includes receiving the additional information corresponding to the n-th voice feature information from the voice feature extraction server.

The method further includes, when a predetermined event occurs, extracting (n+1)-th voice feature data; detecting (n+1)-th voice feature information corresponding to the (n+1)-th voice feature data from among one or more pieces of pre-stored voice feature information; determining the n-th temporal location related to the (n+1)-th voice feature data from the (n+1)-th voice feature information; and displaying the additional information related to the (n+1)-th temporal location.

The method further includes, when the voice feature information corresponding to the (n+1)-th voice feature data is not detected from among one or more pieces of pre-stored voice feature information, transmitting the (n+1)-th voice feature data to the voice feature extraction server; and receiving the (n+1)-th voice feature information relevant to the (n+1)-th voice feature data from the voice feature extraction server 140.

The extracting (n+1)-th voice feature data includes extracting the (n+1)-th voice feature data when a predetermined time period has lapsed.

In accordance with other aspect of the present invention, there is a computer-readable storage medium including a computer executable program stored therein, and the program, when executed by a processor, causes the processor to perform the method for providing additional information on broadcast content described above.

Advantageous Effects

In accordance with the embodiments of the present invention, it is therefore possible to send the additional information relevant to the content that the viewer is watching to the separate terminal independent of a terminal on which the relevant content is displayed.

Further, in accordance with the embodiments of the present invention, it is also possible to reduce the load on the system for providing additional information on broadcast content and minimize the network bandwidth consumption.

DESCRIPTION OF DRAWINGS

FIG. 5 a view illustrating an example where the additional information is displayed on a viewer terminal in accordance with an embodiment of the present invention.

FIG. 7 is a flowchart illustrating a method of providing the additional information in accordance with an embodiment of the present invention.

FIG. 8 is a flowchart illustrating a method of providing the additional information in accordance with another embodiment of the present invention.

BEST MODE

Figure 1:
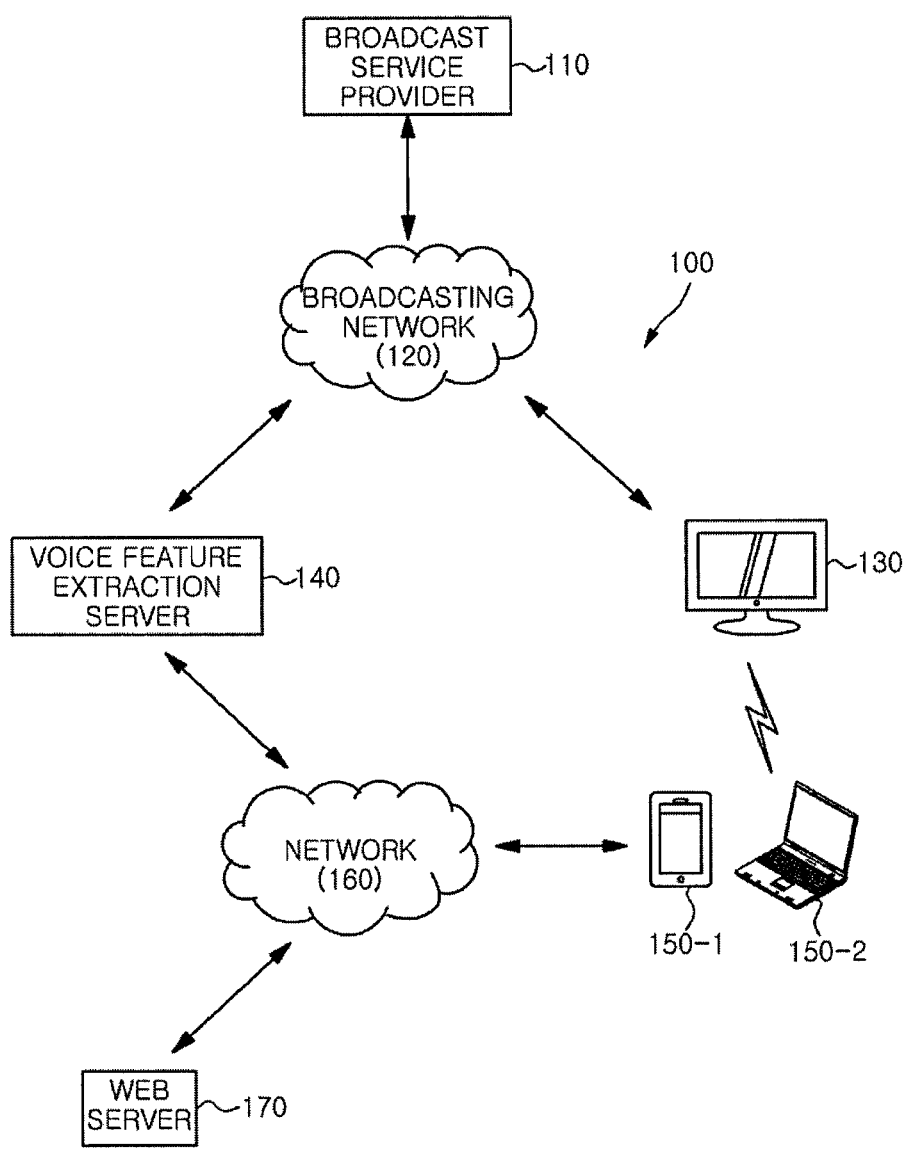
FIG. 1 is a schematic configuration diagram of a system for providing additional information in accordance with an embodiment of the present invention.

The present invention may have various modifications imposed thereto and implemented in various embodiments, and thus particular embodiments will be illustrated in the drawings and will be described in detail in the best mode. However, it should be understood that the present invention is not intended to limit to those particular embodiments, and the present invention may encompass any modifications, equivalents, and alternatives embraced by the spirit and the technical scope of the present invention. In the following description, well-known functions or constitutions will not be described in detail if they would unnecessarily obscure the embodiments of the invention.

The terms of a first, a second, etc. can be used to describe different components, but the components should not be limited by their terminologies. The above terms are merely used for the purpose of distinguishing one component from the other components.

The terms used herein are employed only to describe specific embodiments, but are not intended to limit the present invention thereto. The representation of the singular, unless it clearly indicates in the context otherwise, includes multiple representations. In the present application, it should be understood that the terms "includes or comprises" or "has", and variants thereof are used to specify the presence of features, figures, steps, operations, components, elements, or combination thereof listed herein, but are not intended to exclude the possibility of presence or supplement of one or more pieces of the features, figures, steps, operations, components, elements, or combination thereof. Hereinafter, the embodiments of the present invention will be described in detail with reference to the accompanying drawings.

FIG. 1 is a schematic configuration diagram of a system for providing additional information in accordance with an embodiment of the present invention.

Referring to FIG. 1, a system for providing additional information 100 includes a broadcast service provider 110, a broadcasting network 120, a television 130, a voice feature extraction server 140, a viewer terminal such as a smartphone 150-1, a notebook 150-2, etc. (hereinafter, collectively referred to as a 150-m, where m is a natural number), a data network 160 and a web server 170. Further, although it is not shown in this drawing, the system for providing additional information 100 may also include a radio (not shown).

The broadcast service provider 110 transmit broadcast content to the television 130, a radio (not shown) and/or the voice feature extraction server 140 through the broadcasting network 120 such as a satellite, a ground wave, the Internet, a cable, or the like. The broadcast content collectively means a voice and/or video that are distributed through a broadcasting medium such as a satellite, a ground wave, a cable, or the like, and the broadcasting network 120 means a network through which the broadcast content from the broadcast service provider 110 can be transmitted to the television 130, a radio (not shown) and/or the voice feature extraction server 140.

The television 130 or a radio (not shown) receives the broadcast content and converts it into video and/or voice to output them, so that viewers can recognize the broadcast content acoustically and/or visually.

The voice feature extraction server 140 stores in a reserved storage space the audio feature information in which audio feature data is extracted from the broadcast content and grouped in a predetermined unit. In this regard, the voice feature extraction server 140 can receive the broadcast content from the broadcast service provider 110. Alternatively, the voice feature extraction server 140 may receive the broadcast content through an external data input and output device (e.g., a CD player, a USB port, etc.). The production and extraction of the voice feature information will be described in detail later.

Further, the voice feature extraction server 140 detects voice feature information corresponding to the voice feature data that is received from the viewer terminal 150-m from among one or more pieces of the voice feature information stored in the storage space and transmits the detected voice feature information to the viewer terminal 150-m.

In addition, the voice feature extraction server 140 transmits additional information relevant to the broadcast content that is outputted from the television 130 or a radio (not shown) to the viewer terminal 150-m through the data network 160. Here, the data network 160 means a network through which data can be provided to the viewer terminal 150-m and may include the Internet, a mobile network, an intranet, and so on.

The viewer terminal 150-m produces the voice feature data from an audio signal provided from a microphone in accordance with a predetermined manner once it is invoked in an additional information receiving mode based on the operation of the viewer and sends the produced voice feature data to the voice feature extraction server 140. Further, upon receiving the voice feature information as a response to the transmission of the voice feature data, the viewer terminal 150-m analyzes the voice feature information and determines a temporal location corresponding to the voice feature data from the voice feature information to determine which part of the broadcast content the viewer is watching. The production of the voice feature data and the determination of the temporal location will be described in detail later.

In addition, the viewer terminal 150-m receives the additional information from the voice feature extraction server 140 through the data network 160 and displays the additional information in synchronization with an image that is currently displayed on a screen. Thus, the viewer can recognize the additional information on the broadcast content that the viewer is currently watching in real time. Here, the viewer terminal 150-m may be a smart phone, a mobile phone, tablet computer, PDA (Personal Digital Assistant), personal computer (PC), and the like. Also, the additional information may be data containing information related to the broadcast content, for example, such as information about the broadcast content itself, information about products with which a performer uses, information about a shooting place, a web page address related to the broadcast content, and so on.

Meanwhile, the web server 170 is responsible for providing data relevant to a request from the viewer terminal 150-m when the viewer terminal 150-m is connected thereto. For example, it is assumed that an address of the web server 170 is included in the additional information received from the voice feature extraction server 140, and the viewer terminal 150-m accesses the address of the web server 170 based on the selection of the viewer. In this case, the web server 170 may transmit pre-stored data to the viewer terminal 150-m.

As mentioned above, the voice feature extraction server 140 extracts the audio feature data from the broadcast content that is received from the broadcast service provider 110 and groups the extracted audio feature data in 'a predetermined unit' to save it. After that, the voice feature extraction server detects the additional information corresponding to voice feature data that is received from the viewer terminal 150-*m* and transfers the same to the viewer terminal 150-*m*. Further, the voice feature extraction server 140 may transfer the additional information corresponding to the voice feature information.

The viewer terminal 150-*m* then analyzes the voice feature information and determines which part of the broadcast content the viewer is now watching so that the additional information corresponding to the part can be outputted.

With this configuration, it is possible to separate out a device through which the broadcast content is outputted and another device through which the additional information is outputted, and the additional information is easily available to the viewer without the broadcast content viewing experience being interrupted or inhibited. Hereinafter, the operation of the voice feature extraction server 140 and the viewer terminal 150-*m* will be described with reference to FIGS. 2 and 3.

Figure 2:
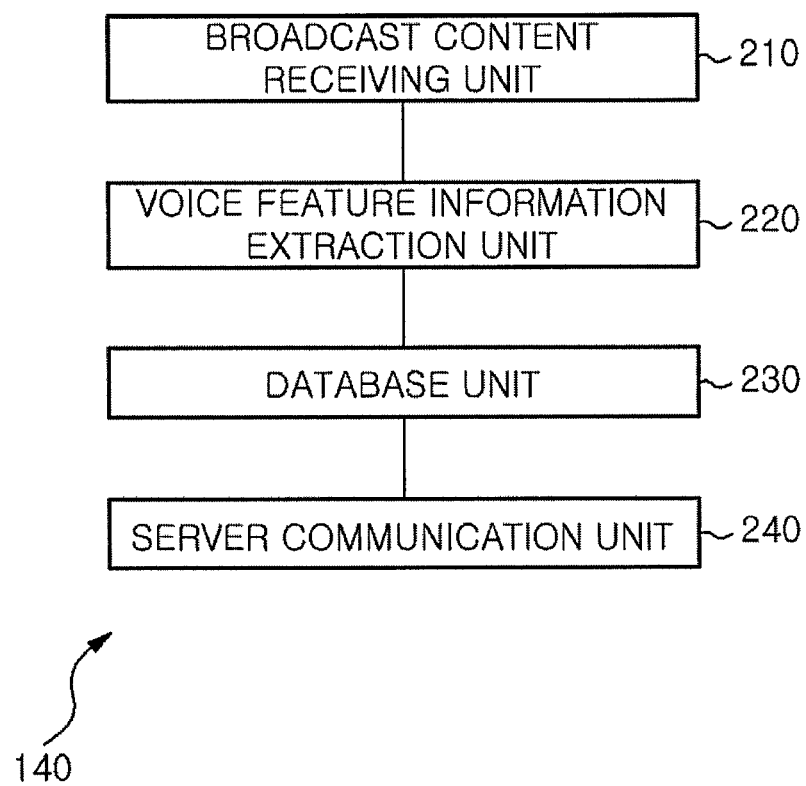
FIG. 2 is a block diagram of the voice feature extraction server in accordance with an embodiment of the present invention.

FIG. 2 is a block diagram of the voice feature extraction server in accordance with an embodiment of the present invention.

Referring to FIG. 2, the voice feature extraction server 140 includes a broadcast content receiving unit 210, a voice feature information extraction unit 220, a database unit 230, and a server communication unit 250. In addition, although it is not specifically shown in this drawing, as set forth above, the voice feature extraction server may further include an external input and output device for receiving and transmitting data from and to an external apparatus or a storage medium (for example, CD player, USB port, etc.) (not shown).

First, the broadcast receiving unit 210 receives the broadcast content from the broadcast service provider 110 that is connected via the broadcasting network 120 and provides the same to the voice feature information extraction unit 220. Here, the broadcast receiving unit 210 may include one or more set-top boxes, and the set-top boxes may be provided as the number of the broadcast channels through which the broadcast content is transmitted. For example, if the number of TV channels is 100 at present (i.e., if the number of broadcast content providers (for example, PPs (Program Providers) such as CNN, NBC, etc.) is 100), the broadcast content receiving unit 210 may have 100 set-top boxes. On the other hand, it is understood that the broadcast content may be received through an external input and output device (not shown).

The voice feature information extraction unit 220 extracts the voice feature information in accordance with a predetermined method using the input broadcast content. More specifically, the voice feature information extraction unit 220 extracts audio feature data from the broadcast content and groups the extracted audio feature data in a predetermined unit to produce the voice feature information.

For example, the voice feature information extraction unit 220 extracts information about audio frequency components from the broadcast content (i.e., the audio feature data) in accordance with the predetermined method and groups the extracted information in the predetermined time unit to produce the voice feature information. For example, it is assumed that the broadcast content has a running time of 60 minutes, and the predetermined time unit is 10 minutes. The voice feature information extraction unit 220 can then produce total six pieces of voice feature information by extracting the audio feature data from the broadcast content. Each of the six pieces of voice feature information may be feature information about the voice of the broadcast content having a length of 10 minutes.

As another example, the voice feature information extraction unit 220 extracts audio feature data from the broadcast content in accordance with a predetermined method and groups the extracted audio feature data in a predetermined volume unit to produce the voice feature information. For example, it is assumed that the audio feature data among the entire volume of the broadcast content has a volume of 300 [KB], and the predetermined volume is 50 [KB]. In this case, the voice feature information extraction unit 220 extracts the audio feature data from the broadcast content to produce total six pieces of voice feature information.

Here, the audio feature data may be audio fingerprint data, and the technique to extract the audio fingerprint from the voice of the broadcast content is known to those skilled in the art, so its detailed description will be omitted.

The database unit the database unit 230 stores the voice feature information that is extracted by the voice feature information extraction unit 220 and each piece of the additional information that is matched to each piece of the voice feature information. Here, the additional information may be information that is stored in the database unit 230 based on the administrator's operation of the voice feature extraction server 140. In other words, the additional information may be not information which is accompanied with the broadcast content for which the voice feature extraction server 140 receives, but information that is entered and stored through a method independent of the reception of the broadcast content. For example, the additional information may be information for which the administrator of the voice feature extraction server 140 produces by manipulating an input unit (e.g., a keyboard, mouse, etc.) which is connected to the voice feature extraction server 140. As another example, the additional information may be information that is received from another device through the Internet, LAN, or the like.

While it has been described that the additional information is matched to the voice feature information, it is merely for the illustrative purpose. For example, the additional information may be matched to an entire volume of the broadcast content. In other words, the additional information may include information about the broadcast content displayed for the duration of the voice feature information matched to the additional information or information about the entire broadcast content.

The server communication unit 240 includes a modem which is connected to the viewer terminal 150-*m* through the data network 160 to transmit and receive data to and from the viewer terminal 150-*m*.

As mentioned above, the voice feature extraction server 140 extracts the audio feature data, groups the extracted audio feature data in a predetermined unit (e.g., in a unit of time and/or in a unit of volume) to produce the voice feature information, and stores the produced voice feature information in the database unit 230. Hereinafter, the operation of the viewer terminal 150-*m* to synchronize the broadcast content that the viewer is watching and the additional information using the voice feature information that is received by the voice feature extraction server 140 will be described in detail as follows.

Referring again to FIG. 1, once the viewer terminal 150-*m* is initiated in an additional information receiving mode, it produces an n-th voice feature data (where n is a natural number) from the audio signal inputted for each predetermined time and transmits the produced voice feature data to the voice feature extraction server 140. Here, the voice feature data may be audio fingerprints, and the technique to extract the audio fingerprints from the voice of the broadcast content is obvious to those skilled in the art, so its detailed description will be omitted. In addition, the n-th voice feature data means the voice feature data that is obtained at an n-th order.

Upon receiving the n-th voice feature data, the voice feature extraction server 140 detects an n-th voice feature information corresponding to the received n-th voice feature data from among one or more pieces of voice feature information that are stored in the database unit 230 and sends the detected n-th voice feature information to the viewer terminal 150-*m*. In this case, the voice feature extraction server 140 may also transmit the additional information that is corresponding to the detected n-th voice feature information to the viewer terminal 150-*m*. For example, in the case where the n-th voice feature information is grouped in a unit of 10 minutes, bandwidth consumption of the data network 160 will almost not occur because the data volume of the audio fingerprint corresponding to the audio for a length of 10 minutes is nothing but about 50 [KB]. In this regard, the n-th voice feature information means the voice feature information including 'an amount' corresponding to the n-th voice feature data.

Upon a receipt of the n-th voice feature information as a response to the transmission of the n-th voice feature data, the viewer terminal 150-*m* determines an n-th temporal location corresponding to the n-th voice feature data from the n-th voice feature information.

Here, the temporal location means a temporal location in the voice feature information corresponding to the voice feature data. For example, it is assumed that the n-th voice feature information is grouped in a unit of 10 minutes, the broadcast content that the viewer is watching has a running time ranging from 1 second to 10 minutes, and the n-th voice feature data corresponds to a 5-minute length within the n-th voice feature information. The viewer terminal 150-*m* will then compare the n-th voice feature information to the n-th voice feature data and determine the temporal location related to the amount corresponding to the n-th voice feature data within the n-th voice feature information. That is, in the above assumption, the viewer terminal 150-*m* can determine whether the received n-th voice feature information is that having a running time ranging from 1 second to 10 minutes of the broadcast content that the viewer is watching and then compare the n-th voice feature information to the n-th voice feature data to determine that the n-th voice feature data matches the 5-minute length in the running time of the broadcast content that the viewer is watching. Therefore, in the above assumption, the n-th temporal location may be equivalent to a 5-minute length.

Thereafter, the viewer terminal 150-*m* can display the additional information corresponding to the determined n-th temporal location. The additional information, as described above, may be received by the viewer terminal 150-*m* along with the n-th voice feature information or may be received by requesting the voice feature extraction server 140 to send the additional information corresponding to the determined n-th temporal location. In other words, the viewer terminal 150-*m* may receive the additional information together with the n-th voice feature information or may receive the additional information by requesting the voice feature extraction server 140 to send the additional information corresponding to the determined n-th temporal location after determining the n-th temporal location. Therefore, upon receiving the request for the additional information corresponding to the n-th temporal location, the voice feature extraction server 140 will retrieve the additional information corresponding to the n-th temporal location from among the additional information corresponding to the n-th voice feature information and transmit the retrieved additional information to the viewer terminal 150-*m*.

On the other hand, when the viewer terminal 150-*m* displays the additional information, it may consider a length of time elapsed from the production of the n-th voice feature information to the determination of the n-th temporal location. As an example, assuming that a length of time elapsed from the production of the n-th voice feature data to the determination of the n-th temporal location is equal to '2 seconds', the viewer terminal 150-*m* will display the additional information of a length of '5 minutes 2 second', instead of the additional information of a length of '5-minute' that is the n-th temporal location.

On the other hand, the viewer terminal 150-*m* extracts an (n+1)-th voice feature data when a predetermined event occurs after extracting the n-th voice feature data. For example, if a predetermined time period is lapsed after the n-th voice feature data is extracted, the viewer terminal 150-*m* may extract the (n+1)-th voice feature data from an audio signal that is received from a microphone. As another example, the viewer terminal 150-*m* may extract the (n+1)-th voice feature data from an audio signal that is received from a microphone based on the manipulation of an input unit (e.g., a touchpad, keypad, etc.) by the viewer.

Further, the viewer terminal 150-*m* compares the extracted (n+1)-th voice feature data and one or more pieces of pre-stored voice feature information to determine the (n+1)-th temporal location. In the viewer terminal 150-*m*, the operation of determining the (n+1)-th temporal location may be identical or similar to that of determining the n-th temporal location. In other words, the viewer terminal 150-*m* may store the received voice feature information; and when a predetermined event occurs, the viewer terminal 150-*m* will extract the (n+1)-th voice feature data and compare the extracted (n+1)-th voice feature data and one or more pieces of the pre-stored voice feature information to determine the (n+1)-th temporal location (that is, a running time of the broadcast content at the time when the (n+1)-th voice feature data is produced).

Further, the viewer terminal 150-*m* display the additional information corresponding to the determined (n+1)-th temporal location. The additional information corresponding to the (n+1)-th temporal location may be information that has been received from the voice feature extraction server 140 and has already been stored in the viewer terminal 150-*m*, or information that is received by requesting from the viewer terminal 150-*m* the voice feature extraction server 140 to send the additional information corresponding to the (n+1)-th temporal location.

Further, the viewer terminal 150-*m* transmit the (n+1)-th voice feature data to the voice feature extraction server 140 when the (n+1)-th temporal location cannot be determined. This reason is that the voice feature information corresponding to the (n+1)-th voice feature data is not stored in the viewer terminal 150-*m*. Thus, once the voice feature extraction server 140 receives the (n+1)-th voice feature data, it retrieves the (n+1)-th voice feature information corresponding to the (n+1)-th voice feature data from the database unit 230 and transmits the retrieved the (n+1)-th voice feature data to the viewer terminal 150-*m*. After that, the viewer terminal 150-*m* determines the (n+1)-th temporal location using the received (n+1)-th voice feature information and displays the additional information corresponding to the (n+1)-th temporal location.

As described above, in a system for providing additional information 100 in accordance with the present invention, the voice feature extraction server 140 just detects the n-th voice feature information corresponding to the n-th voice feature data to transmit it to the viewer terminal 150-*m*, and the viewer terminal 150-*m* determines the n-th temporal location to display the additional information in synchronization with the broadcast content that the viewer is watching.

Determining the n-th temporal location that is performed in the viewer terminal 150-*m* is a task to locate the temporal location of the n-th voice feature data, which is a very time-consuming task for the voice feature extraction server 140 to perform it. This is because that a large amount of voice feature information are stored in the database unit 230 of the voice feature extraction server 140, and the voice feature data is received from a large number of the viewer terminals 150-*m*.

Thus, in accordance with a system for providing additional information 100 of the present invention, the viewer terminal 150-*m* is designed to perform the operation of determining the n-th temporal location, thereby reducing the load weighted on the voice feature extraction server 140 and minimizing the network bandwidth consumption. The reason is that the voice feature extraction server 140 is designed to receive a low volume of the voice feature data from the viewer terminal 150-*m* and in response thereto, transmit a low volume of the voice feature information to the viewer terminal 150-*m*.

In addition, the audio fingerprint corresponding to the voice feature data may be different from the audio fingerprint corresponding to voice feature information because a variety of methods may be used to extract the audio fingerprint from a voice signal. Since separate audio fingerprints that are different from each other have been used as described above, the voice feature information that are produced through different ways may be stored in the database unit 230 of the voice feature extraction server 140. That is, the voice feature extraction server 140 may produces a plurality of voice feature information using a multiplicity of audio fingerprint producing methods per broadcast content. For example, the voice feature extraction server 140 can produce audio feature data in accordance with a first audio fingerprint producing method and a second audio fingerprint producing method per broadcast content.

Here, a scenario is assumed where the viewer terminal 150-*m* produces voice feature data using a first audio fingerprint producing method (hereinafter, referred to as a first method) and a second audio fingerprint producing method (hereinafter, referred to as a second method), and the voice feature data produced by the first method is transmitted to the voice feature extraction server 140. Then, the voice feature extraction server 140 detects voice feature information corresponding to the received voice feature data from among the voice feature information that are produced by the first method and retrieves voice feature information corresponding to 'the detected voice feature information' from among the voice feature information produced by the second method to transmit "retrieved voice feature information" to the viewer terminal 150-*m*. Subsequently, the viewer terminal 150-*m* receives the voice feature information and compares the voice feature data produced by the second method and the received voice feature information to determine the temporal location.

This is because that the audio fingerprint producing method suitable for detecting the voice feature information corresponding to the voice feature data may be different from the audio fingerprint producing method suitable for correctly determining the temporal location corresponding to the voice feature data from among the voice feature information.

While it has been assumed that the additional information is stored in the voice feature extraction server 140 for the convenience of understanding and explanation, the additional information may be stored in a server and/or device other than the voice feature extraction server 140. Therefore, it is obvious that the server and/or device that store the additional information do not limit the scope of the present invention.

Hereinafter, a description will be made through the comparison of the examples of the convention art and the present invention with reference to FIG. 3 to FIG. 5.

Figure 3:
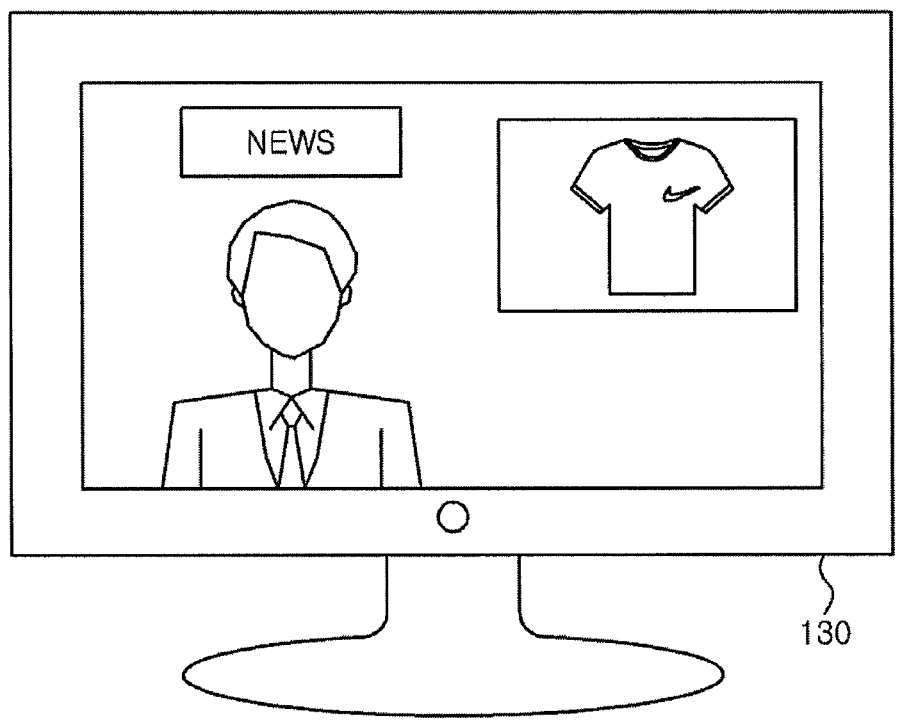
FIG. 3 is a view illustrating an example of an image of the broadcast content that is displayed on a television screen.

FIG. 3 is a view illustrating an example of an image of the broadcast content that is displayed on a television screen; FIG. 4 is a view illustrating an example where the additional information is displayed on a television screen in accordance with a conventional art; and FIG. 5 is a view illustrating an example where the additional information is displayed on a viewer terminal in accordance with an embodiment of the present invention.

First, referring to FIG. 3, there is illustrated an example in which the broadcast content corresponding to the news is displayed on the television 130 where the contents of the news introduces a new product of NIKE.

Figure 4:
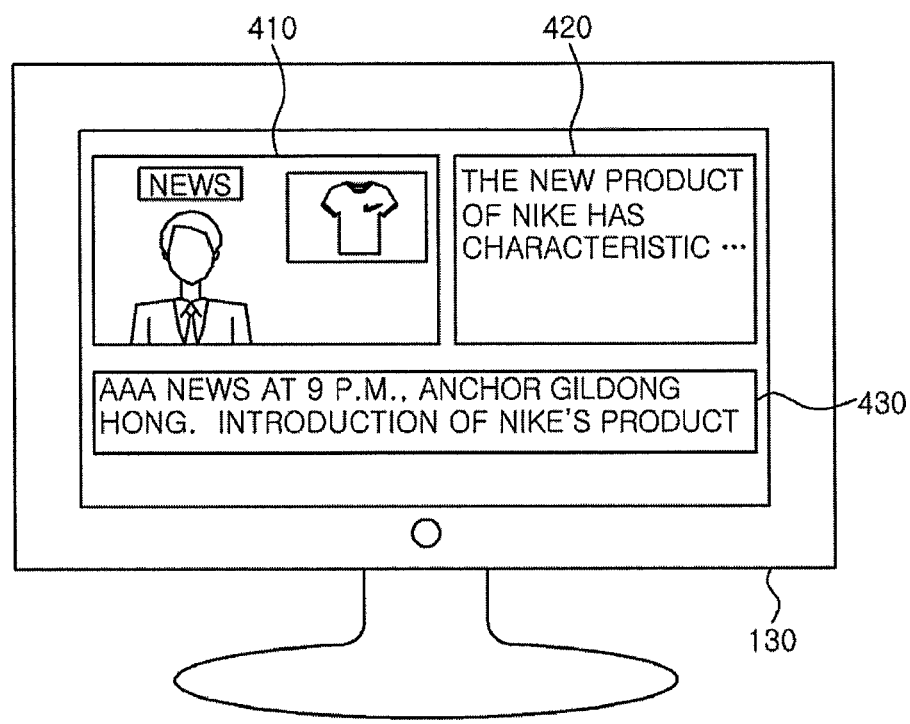
FIG. 4 is a view illustrating an example where the additional information is displayed on a television screen in accordance with a conventional art.

In addition, referring to FIG. 4, there is illustrated an example in which the news of the broadcast content 410, the introduction of a new product of NIKE 420, and the announcement of the news program itself 430 are displayed on the television 130 in accordance with a conventional art. In the conventional art, the additional information relevant to the broadcast content is overlapped and displayed on the image of the broadcast content or, as shown in FIG. 4, the additional information needs to be displayed in the space that is secured while reducing an area to display the broadcast content. This is because that both of the broadcast content and the additional information should be displayed on one device or one of them should be displayed on the device. In addition, in order for the viewer to enjoy the e-commerce or the additional information, the viewer may need to use a remote control 440. However, the remote control 440 has a problem in that it is not a suitable interface for utilizing the additional information of the broadcast content since it is dedicated to change the television channel.

On the contrary, referring to FIG. 5, in accordance with the present invention, the news of the broadcast content is fully displayed on the television 130, and the introduction of a new product of NIKE 510 and the announcement of the news program itself 520 that are something of the additional information are displayed on the viewer terminal 150-*m*. Accordingly, the viewer can acquire the introduction of the new product of NIKE through the viewer terminal 150-*m*, and furthermore can access the web site where the viewer can purchase the new product.

Therefore, in accordance with the present invention, since the device on which the additional information is displayed is independent of the display device on which the broadcast content is displayed, it will be obvious to those skilled in the art that the use of the additional information does not hinder the viewing experience of the viewer and may promote the activation of T-commerce.

Figure 6:
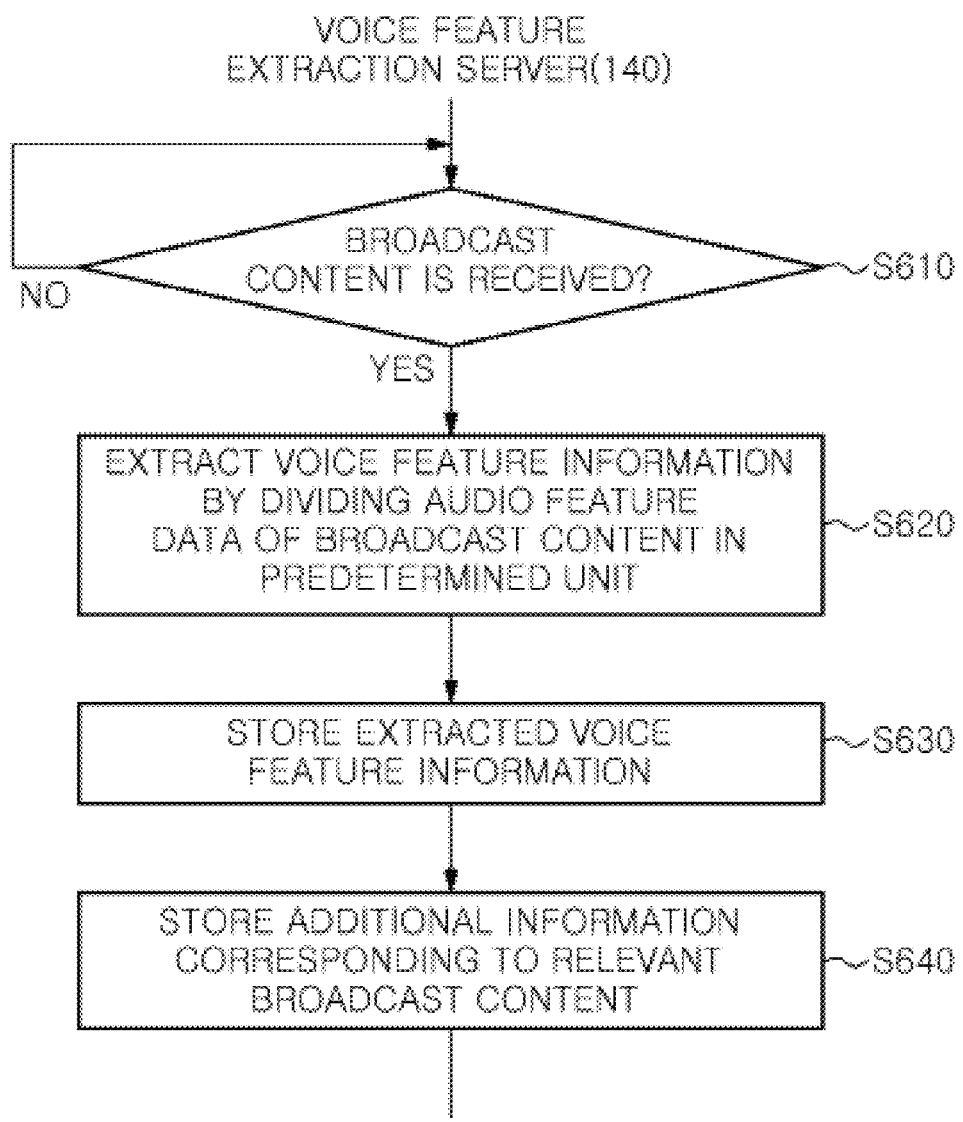
FIG. 6 is a flowchart illustrating a method of storing voice feature information of the broadcast content by the voice feature extraction server in accordance with an embodiment of the present invention.

FIG. 6 is a flowchart illustrating a method of storing the voice feature information of the broadcast content in the voice feature extraction server in accordance with an embodiment of the present invention.

Hereinafter, the method of storing the voice feature information of the broadcast content in the voice feature extraction server 140 in accordance with an embodiment of the present invention will be described with reference to FIG. 6. While each step that will be described below may be performed by the individual components of the voice feature extraction server 140, following description will be collectively made that the steps are entirely performed by the voice feature extraction server 140 for the convenience of understanding and explanation. Thus, the entity to perform each of the steps will be omitted.

In step S610, when the broadcast content is received from the broadcast service provider 110 that is connected through the broadcasting network 120, or when the broadcast content is received through an external input and output device (not shown), the audio feature data is extracted from the broadcast content and is grouped in the predetermined unit to extract voice feature information (step S620). For example, the voice feature extraction server 140 extracts information of voice frequency components of the broadcast content (i.e., the audio feature data) in accordance with a predetermined method and groups the extracted information in a predetermined unit of time to produce the voice feature information. As another example, the voice feature information extraction unit 220 extracts the audio feature data of the broadcast content in accordance with a predetermined method, groups the extracted information in a predetermined unit of volume to produce the voice feature information. Here, the audio feature data may be audio fingerprints, and the technique to extract the audio fingerprints is known to those skilled in the art, so its description will be omitted.

In step S630, the extracted voice feature information is stored in a reserved storage space (i.e., a database unit 230).

In step S640, the additional information corresponding to the relevant broadcast content is also stored in the reserved storage space. Here, the additional information is may be stored in the database 230 based on the manipulation of the administrator of the voice feature extraction server 140. In other words, the additional information may be not information which is accompanied with the broadcast content for which the voice feature extraction server 140 receives, but information that is received through a method independent of the reception of the broadcast content. Further, the additional information may include information matched to each piece of the voice feature information or information about the entire broadcast content.

FIG. 7 is a flowchart illustrating a method of providing the additional information of the broadcast content in accordance with an embodiment of the present invention.

Hereinafter, the method of providing the additional information of the broadcast content will be described with reference to FIG. 7. While each step that will be explained below may be performed by the respective components of the voice feature extraction server 140 and the viewer terminal 150-*m* as described with reference to FIGS. 1 and 2, following description will be collectively made that the steps are entirely performed by the voice feature extraction server 140 or the viewer terminal 150-*m* for the convenience of understanding and explanation. In addition, the respective steps that will be explained below may be the steps that will be progressed after the process of storing the feature information of the broadcast content as described with reference to FIG. 6.

When the viewer terminal 150-*m* is invoked in the additional information receiving mode based on the manipulation of the viewer in step S710, it extracts and transmits the n-th voice feature data from the audio signal that is received through the microphone in accordance with a predetermined method in step S720. Here, the audio feature data may be an audio fingerprint, and the technique to extract the audio fingerprint from the voice signal of the broadcast content is well known to those skilled in the art, so its description will be omitted.

In step S730, the voice feature extraction server 140 detects the n-th voice feature information corresponding to the received n-th voice feature data. That is, the voice feature extraction server 140 may detect the n-voice feature information corresponding to the n-th voice feature data by comparing the received n-th voice feature data with one or more pieces of the voice feature information that is pre-stored in the database unit 230.

In step S740, the voice feature extraction server 140 transmits the detected n-th voice feature information to the viewer terminal 150-*m*.

In step S750, the viewer terminal 150-*m* determines the n-th temporal location using the received n-th voice feature information and the n-th voice feature data. That is, the viewer terminal 150-*m* determines the n-th temporal location corresponding to the n-th voice feature data from the n-voice feature information. Here, the temporal location means a temporal location in the voice feature information, which corresponds to the voice feature data. For example, it is assumed that the n-th voice feature information is grouped in a unit of 10 minutes and the broadcast content that the viewer is watching has a running time ranging from 1 second to 10 minutes. In addition, it is assumed that the n-th voice feature data corresponds to a length of 5-minute within the n-th voice feature information. Then, the viewer terminal 150-*m* will compare the n-th voice feature information to the n-th voice feature data and then determine the temporal location relative to an amount corresponding to the n-th voice feature data in the n-th voice feature information. That is, in the above assumption, the viewer terminal 150-*m* can determine whether the received n-th voice feature information is that having a running time ranging from 1 second to 10 minutes of the broadcast content that the viewer is watching and compare the n-th voice feature information to the n-th voice feature data to determine that the n-th voice feature data has the length of 5-minute in the running time of the broadcast content that the viewer is watching. Thus, in the above assumption, the n-th temporal location may be equivalent to a length of 5-minute.

In step S760, the viewer terminal 150-*m* transfers the additional information request to request the additional information, which corresponds to the n-th temporal location, to the voice feature extraction server 140, and in step S770, in response to the received additional information request, the voice feature extraction server 140 retrieves the additional information corresponding to the n-th temporal location and transmits it to the viewer terminal 150-*m*.

In step S780, upon receiving the additional information, the viewer terminal 150-*m* displays the additional information corresponding to the n-th temporal location. In this case, the viewer terminal 150-*m* may display the additional information in consideration of a length of time elapsed from the production of the n-th voice feature data to the determination of the n-th temporal location.

FIG. 8 is a flowchart illustrating a method of providing the additional information of the broadcast content in accordance with another embodiment of the present invention.

Hereinafter, the method of providing the additional information of the broadcast content in accordance with another embodiment of the present invention will be described with reference to FIG. 8. Each step that will be explained below may be performed by the viewer terminal 150-*m* as described with reference to FIG. 1. Therefore, the entity that performs the respective steps will be omitted.

In step S810, when the predetermined event occurs, the (n+1)-th voice feature data is extracted (step S820). For example, the viewer terminal 150-*m* may extract the (n+1)-th voice feature data from the audio signal inputted through the microphone when a predetermined time period has lapsed after extracting the n-th voice feature data. As another example, the viewer terminal 150-*m* may extract the (n+1)-th voice feature data from the audio signal entered through the microphone based on the manipulation of the input unit (e.g., a touch pad, a key pad, etc.) (not shown) by the viewer.

In step S830, the extracted (+1)-th voice feature data is compared to one or more pieces of the pre-stored voice feature information to determine the (n+1)-th temporal location. In the viewer terminal 150-*m*, the operation of determining the (n+1)-th temporal location may be identical or similar to that of determining the n-th temporal location. To put it another way, the viewer terminal 150-*m* may store the received voice feature information; and when a predetermined event occurs, the viewer terminal 150-*m* may extract the (n+1)-th voice feature data and compare the extracted (n+1)-th voice feature data to one or more pieces of the pre-stored voice feature information to determine the (n+1)-th temporal location (that is, a running time of the broadcast content at the time when the (n+1)-th voice feature data is produced).

If it is possible to determine the (n+1)-th temporal location in step S840, the method goes to step S850 where the additional information corresponding to the determined (n+1)-th temporal location is displayed. The additional information corresponding to the (n+1)-th temporal location may be information that have already been received from the voice feature extraction server 140 and stored in the viewer terminal 150-*m*, or may be information that is received by requesting the voice feature extraction server 140 to send the additional information corresponding to the (n+1)-th temporal location.

Meanwhile, as a result of the determination in step S840, if the (n+1)-th temporal location does not determined, the method proceeds to step S860 where the (n+1)-th voice feature is transmitted to the voice feature extraction server 140. The reason is that the case where the (n+1)-th temporal location does not located may be the case where voice feature information corresponding to the (n+1)-th voice feature data is not stored in the viewer terminal 150-*m*.

Therefore, in step S870, when receiving the (n+1)-th voice feature data, the viewer terminal 150-*m* retrieves the (n+1)-th voice feature information corresponding to the (n+1)-th voice feature data from the database unit 230 and transmit it to the viewer terminal 150-*m*, and the viewer terminal 150-*m* then determines the (n+1)-th temporal location using the received (n+1)-th voice feature information to display the additional information (that is, the aforementioned step S730 and its following steps will be repeated).

As described above, the voice feature extraction server 140 of the present invention may transmit a portion of the audio feature data (i.e., the voice feature information) corresponding to the broadcast content that the viewer is watching or listening to 150, and the viewer terminal 150-*m* may determine the temporal location corresponding to the voice feature data from the received voice feature information and display the additional information in synchronization with the broadcast content that the viewer is watching or listening.

In accordance with the embodiments of the present invention, the device on which the broadcast content is displayed is independent of the device on which the additional information is displayed. Therefore, even if the viewer utilizes the additional information, the viewing experience of the broadcast content of the viewer may not be hindered or interrupted any more. Further, in accordance with the embodiments of the present invention, the device that displays the additional information may be a smart phone, tablet computer, or the like that the viewer can easily operate, which may contribute to the activation of T-commerce. Even if the viewer accesses the web page that is displayed as the additional information by touching a touch pad on the smart phone, the viewing experience is not hindered inhibited or stopped, which leads to the possibility of smooth watching of the broadcast content and wide use of the additional information.

For example, a scenario is assumed where a viewer enjoys the broadcast content to introduce a new song of a singer 'A' through a radio (not shown). Then, the viewer can obtain information about the relevant new song (e.g., a composer, a lyricist, a song lyrics, etc.) in real time using his/her smart phone 150-1, and furthermore, can access a web page from which such a new song is immediately available with a simple touch operation on a touch pad.

As another example, a scenario is assumed where a viewer enjoys the broadcast content to display an advertisement about a product 'B' through the television 130. Then, the viewer can obtain information about the relevant product (e.g., price, feature, purchasing event, etc.) in real time his/her tablet computer (not shown), and furthermore, can access a web page from which the relevant product is immediately available with a simple touch operation on a touch pad.

Further, in accordance with the embodiments of the present invention, even if the viewer watches an analog television 130 or a television 130 in a public place, the viewer can use the additional information relevant to the broadcast content while watching the broadcast content, and a listener who is listening a radio can also use the additional information relative to the broadcast content. In past, a viewer who has not a usable Internet television and a listener who are listening a radio cannot use in real time the additional information relevant to the broadcast content that the viewer is watching or the listener is listening in the past. However, in accordance with the embodiments of the present invention, once voice feature data is produced and transmitted through the use of the smart phone 150-1, the voice feature extraction server 140 will transmit the relevant additional information to the smart phone 150-1, and the smart phone 150-1 will then display the received additional information by synchronizing it with the broadcast content. Therefore, it will be appreciated that the viewer who has the analog television 130 and the listener who has a radio (not shown) can also use the additional information of the broadcast content in real time.

Further, in accordance with the embodiments of the present invention, since the viewer uses the additional information of the broadcast content by use of a viewing data that is produced through the viewer terminal 150-*m*, it will be appreciated that the viewer need not to purchase a separate Internet television.

Furthermore, in accordance with the embodiments of the present invention, the voice feature extraction server 140 serves merely to detect the n-th voice feature information corresponding to the n-th voice feature data and transmit it to the viewer terminal 150-*m*, and the viewer terminal 150-*m* determines the (n+1)-th temporal location and displays the additional information in synchronization with the broadcast content that the viewer is watching, whereby the load weighted on the voice feature extraction server 140 can be reduced and the network bandwidth consumption can be minimized accordingly. This is because that the voice feature extraction server 140 is designed to receive a low volume of voice feature data and transmit a low volume of voice feature information to the viewer terminal 150-*m* in response thereto.

The method of providing the additional information of the broadcast content in accordance with the embodiments of the present invention as mentioned above may be implemented in the form of computer readable codes on a computer readable media. The computer readable media may include any kinds of storage media on which data that can be decoded by a computer system is stored. For example, the computer storage media may include ROM (Read Only Memory), RAM (Random Access Memory), a magnetic tape, a flash memory, optical data storage and the like. Further, the computer readable storage media can be stored and carried out as codes that are distributed in a computer system connected to a computer network and are readable in a distributed manner.

In addition, while the aforementioned description has been made with reference to the preferred embodiments of the present invention, it will be appreciated to those skilled in the art that the present can make various modifications and changes within the range without departing from the spirit and scope claimed in following claims.

The invention claimed is:

1. A method performed by a viewer terminal for providing additional information on broadcast content to a viewer, the method comprising:
    extracting n-th voice feature data (where n is a natural number) from an audio signal that is inputted through the viewer terminal in a predetermined method to transmit it to a voice feature extraction server that is connected through a data network;
    receiving, from the voice feature extraction server, n-th voice feature information corresponding to the n-th voice feature data from among voice feature information in which audio feature data of the broadcast content is grouped in a predetermined unit;
    determining an n-th temporal location relevant to the n-th voice feature data from the received n-th voice feature information that corresponds to the n-th voice feature data;
    displaying the additional information related to the n-th temporal location where n is a natural number;
    when a predetermined event occurs, extracting (n+1)-th voice feature data;
    detecting (n+1)-th voice feature information corresponding to the (n+1)-th voice feature data from among one or more pieces of pre-stored voice feature information;
    determining the n-th temporal location related to the (n+1)-th voice feature data from the (n+1)-th voice feature information;
    displaying the additional information related to the (n+1)-th temporal location;
    when the voice feature information corresponding to the (n+1)-th voice feature data is not detected from among one or more pieces of pre-stored voice feature information, transmitting the (n+1)-th voice feature data to the voice feature extraction server; and
    receiving the (n+1)-th voice feature information corresponding to the (n+1)-th voice feature data from the voice feature extraction server.

2. The method of claim 1, wherein said displaying the additional information comprises:
    transmitting a request for the additional information in which information about the n-th temporal location is included to the voice feature extraction server;
    receiving the additional information related to the n-th temporal location from the voice feature extraction server as a response to the request for the additional information; and
    displaying the additional information related to the n-th temporal location.

3. The method of claim 1, further comprising:
    receiving the additional information relevant to the n-th voice feature information from the voice feature extraction server.

4. The method of claim 1, wherein said extracting (n+1)-th voice feature data comprises: extracting the (n+1)-th voice feature data when a predetermined time period has lapsed.

5. A non-transitory computer-readable storage medium including a computer executable program stored therein, wherein the program, when executed by a processor, causes the processor to perform the method for providing additional information on broadcast content disclosed in claim 1.

6. A viewer terminal configured to:
    extract n-th voice feature data (where n is a natural number) in a predetermined method from an audio signal that is inputted to transmit it to a voice feature extraction server that is connected through a data network;
    receive, from the voice feature extraction server, n-th voice feature information corresponding to the n-th voice feature data from among voice feature information in which audio feature data of the broadcast content which is received by the voice feature extraction server is grouped in a predetermined unit; and
    determine an n-th temporal location related to the n-th voice feature data from the received n-th voice feature information that corresponds to the n-th voice feature data,
    wherein the viewer terminal comprises a display unit configured to display additional information relevant to the n-th temporal location,
    wherein the viewer terminal is configured to: when a predetermined event occurs, extract (n+1)-th voice feature data; detect (n+1)-th voice feature information corresponding to the (n+1)-th voice feature data from among one or more pieces of pre-stored voice feature information; and determine the n-th temporal location related to the (n+1)-th voice feature data from the (n+1)-th voice feature information,
    wherein the display unit is configured to display the additional information related to the (n+1)-th temporal location, and
    wherein the viewer terminal is configured to: when the voice feature information corresponding to the (n+1)-th voice feature data is not detected from among one or more pieces of pre-stored voice feature information, transmit the (n+1)-th voice feature data to the voice feature extraction server; and receive the (n+1)-th voice feature information that corresponds to the (n+1)-th voice feature data from the voice feature extraction server.

7. The viewer terminal of claim 6, wherein the viewer terminal controller is configured to:
    before said displaying the additional information relevant to the n-th temporal location by the display unit, transmit a request for the additional information in which information about the n-th temporal location is included to the voice feature extraction server; and
    receive the additional information related to the n-th temporal location from the voice feature extraction server as a response to the request for the additional information.

8. The viewer terminal of claim 6, wherein the viewer terminal is configured to receive the additional information relevant to the n-th voice feature information from the voice feature extraction server.

9. The viewer terminal of claim 6, wherein the viewer terminal is configured to extract the (n+1)-th voice feature data when a predetermined time period has lapsed.

* * * * *